March 23, 1937.   L. J. ANDRES   2,074,636
PROJECTION SHUTTER
Filed Nov. 8, 1933   3 Sheets-Sheet 1

INVENTOR:
Lloyd J. Andres
By John E. Titus
ATTY.

March 23, 1937.  L. J. ANDRES  2,074,636
PROJECTION SHUTTER
Filed Nov. 8, 1933   3 Sheets-Sheet 2
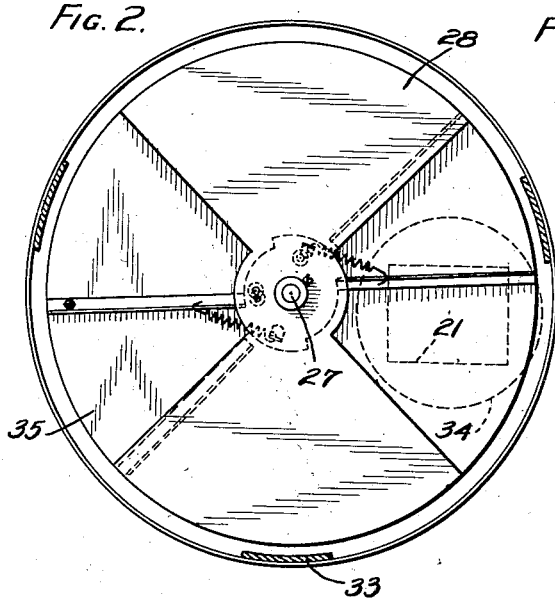
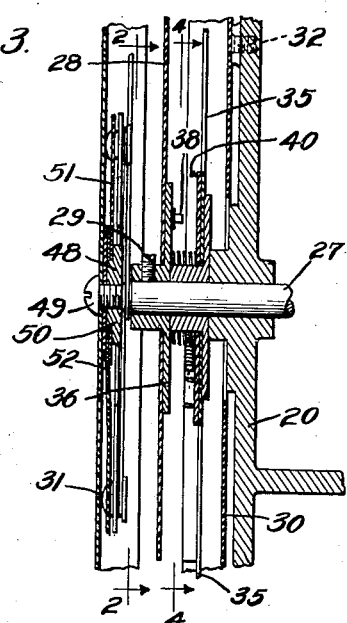
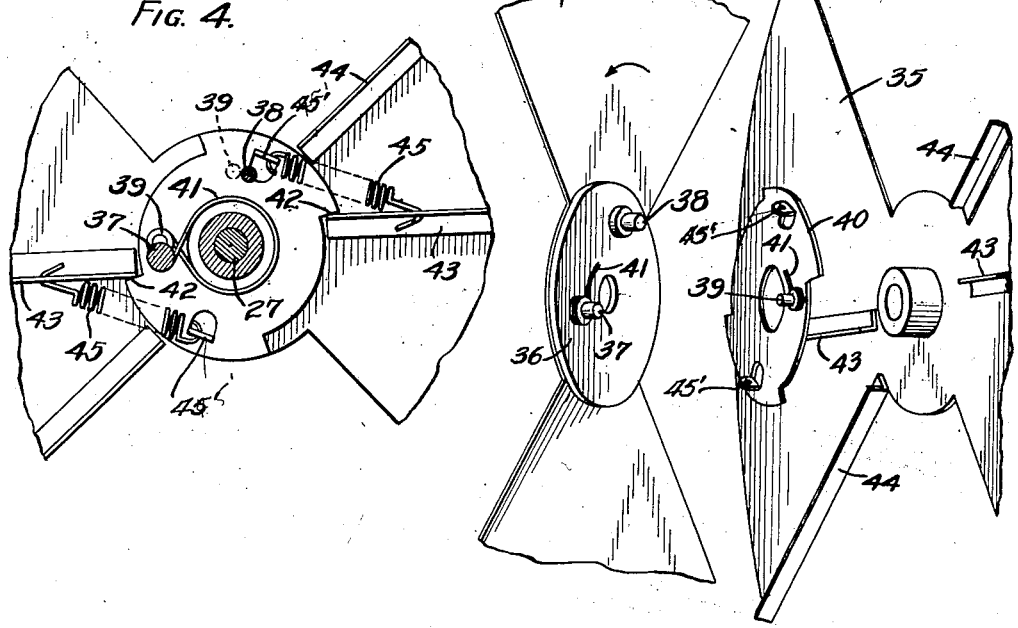
INVENTOR:
Lloyd J Andres
By John E. Titus
ATTY.

March 23, 1937.  L. J. ANDRES  2,074,636
PROJECTION SHUTTER
Filed Nov. 8, 1933  3 Sheets-Sheet 3
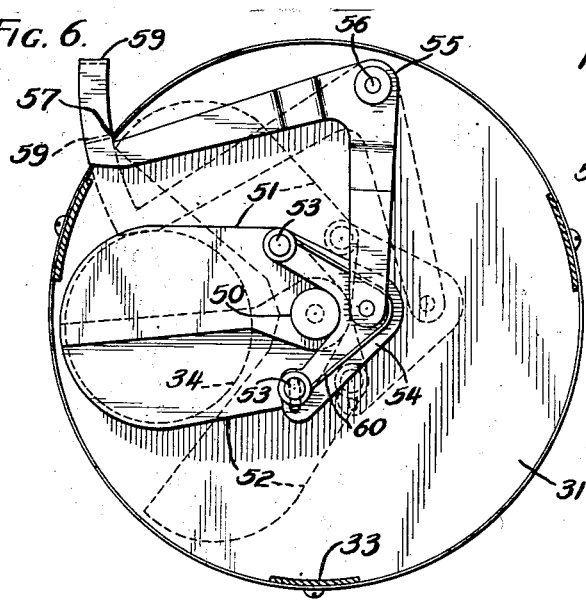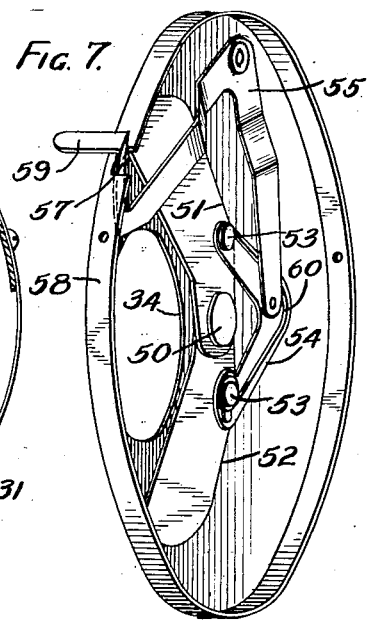
INVENTOR:
Lloyd J. Andres
By John E. Titus
ATTY.

Patented Mar. 23, 1937

2,074,636

UNITED STATES PATENT OFFICE 2,074,636

PROJECTION SHUTTER

Lloyd J. Andres, Grand Rapids, Mich., assignor to Automatic Musical Instrument Company, Grand Rapids, Mich., a corporation of Michigan Application November 8, 1933, Serial No. 697,167

7 Claims. (Cl. 88—19.3)

This invention relates to improvements in the shutter means of motion picture machines, projectors, and the like.

In motion picture projectors where an intermittent light interrupter is interposed between the lamp and the aperture plate over which the film is moved, a great deal of heat from the lamp passes the interrupter and heats the plate and film, even where the lamp interrupter and film are separately housed. Therefore, an object of this invention is to utilize the rotation of the light interrupting means for providing a fan to cool the aperture plate and film.

Also if the film stands still under the action of the light beam, it is quickly distorted and damaged by the heat and even ignited; and further objects of this invention are to provide means whereby the light is automatically cut off from the film whenever the film stops moving.

Another object is to provide a simple and efficient, quick operating light douser having a structure which will withstand hard usage, and which occupies a small space laterally.

Other objects and advantages will become apparent in the following description, taken with reference to the acompanying drawings, in which an illustrative embodiment of this invention is shown:

Fig. 2 is a cross section through the shutter housing, taken on the line 2—2 of Fig. 1.

Fig. 3 is an enlarged vertical section through the central portion of the shutter means.

Fig. 4 is a fragmentary sectional view taken on the lines 4—4 of Fig. 1 and Fig. 3.

Fig. 5 is an expanded perspective view of the intermittent shutter parts.

Fig. 6 is a view of the douser mechanism, taken on the line 6—6 of Fig. 1.

Fig. 7 is a perspective view of the parts shown in Fig. 6.

Figure 1:
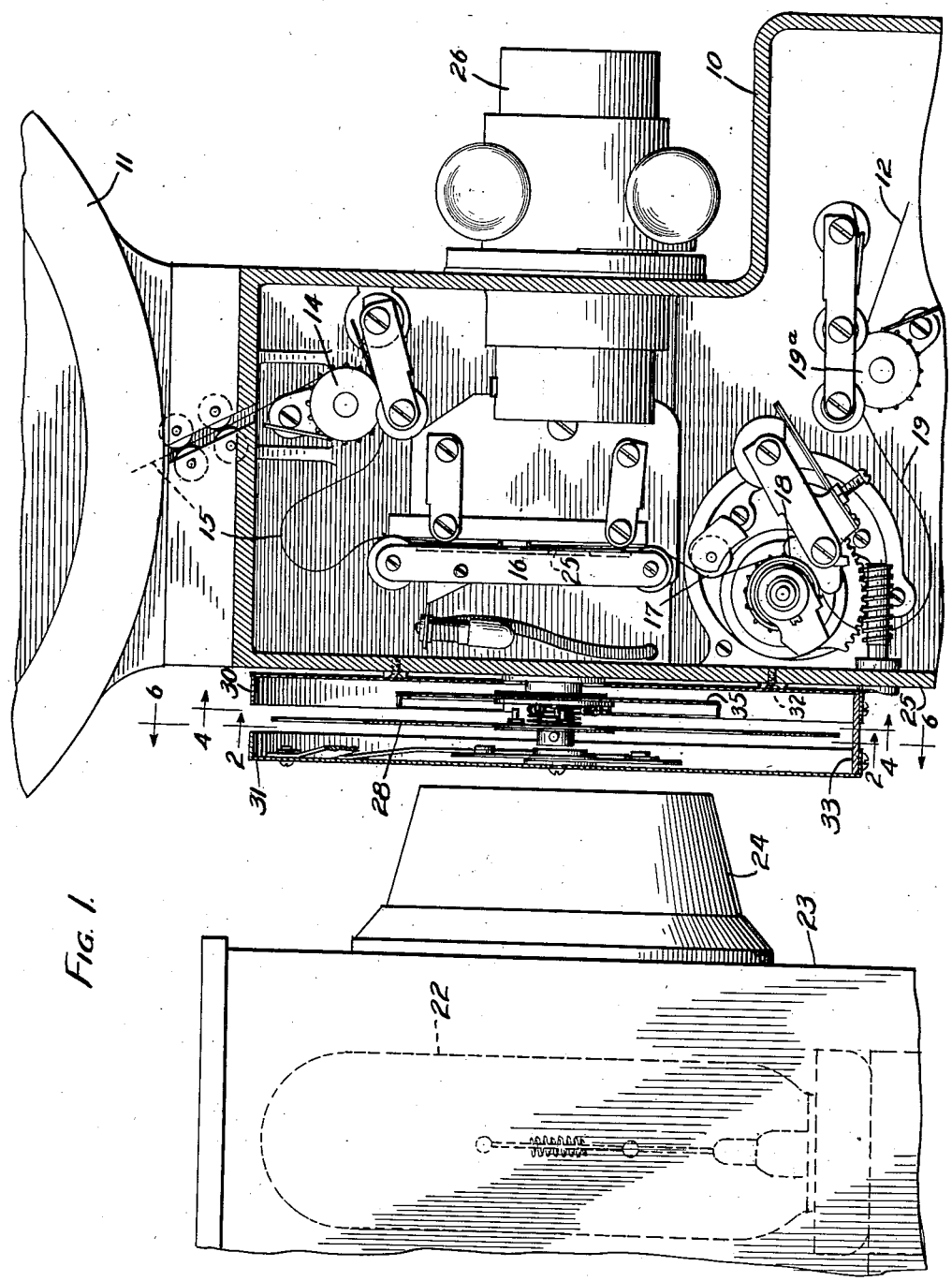
Fig. 1 is a fragmentary side elevation of a motion picture machine, with the shutter and projector housings shown in section.

The projector shown comprises a housing, on top of which is mounted a film roll case 11. The film 12 is drawn out of the case 11 by a continuously driven toothed wheel 14; looped at 15; and moved intermittently in relation to an aperture plate 16 and over a framing roller 17 by an intermittently driven toothed wheel 18. From the drive wheel 18, the film passes through a loop 19 and over a continuously driven toothed wheel 19a, and on out of the machine. Said film moving and guiding elements are mounted and enclosed in the housing 10.

The rear wall 20, of the housing 10, has a rectangular aperture 21, as shown in broken lines in Fig. 2.

The light source comprises a high powered lamp 22 enclosed in a lamp house 23 which is mounted at the rear of the projector housing; and the light passes through a condensing lens, not shown, mounted in a tubular housing 24 on the front of the lamp house; through the aperture 21 and the aperture 25 in the plate 16; through the film 12; and out through an optical tube 26, mounted in the front wall of the housing 10.

A shutter drive shaft 27, which is continuously driven in timed relation with the intermittent sprocket 18, extends through the rear wall 20 of the housing 10; and on the end of this shaft is fixedly mounted a two bladed shutter 28, which in rotation covers the aperture 21 during the periods the film is moving on the aperture plate.

The shutter mechanism is enclosed at the sides by two inwardly flanged circular housing plates 30 and 31. The forward plate 30 is secured to the rear wall 20 by screws 32, and the rear plate 31 is connected in spaced relation to the forward plate by three bars 33. Both of said plates have circular light apertures 34 which are in alignment with the housing aperture 21, as indicated in Fig. 2.

For automatically covering the aperture 21 and shutting the light off from the film when the shutter 28 is standing still, an auxiliary shutter 35 is rotatably mounted on the shaft 27, spaced in front of the main shutter 28. The shutter 35 conforms to the main shutter, and is yieldably positioned at rest to cover the apertures between the two blades of the main shutter, as shown in Fig. 2. The hub portion 36 of the main shutter has two circularly disposed spaced stop pins 37 and 38, fixedly secured thereto; and a stud 39, secured to a connecting disc 40, operates between the pins 37 and 38, so that the rotation or oscillation of the disc is limited thereby, the disc 40 being rotatably mounted on the shaft 27, adjacent the shutter 35.

The disc is connected to the main shutter by a light spring 41 which is connected at one end to the stud 39, and at the other end to the leading pin 37 so that the disc and the auxiliary shutter which is connected to the disc are yieldably urged forwardly with respect to the main shutter. The disc is provided with oppositely disposed peripheral lugs 42 which are engaged by the inner ends of angular vane members 43 which, together with vanes 44, are provided on the blades of the auxiliary shutter 35. The vanes 43 are yieldably connected to upturned lugs 45', formed in the disc 36, by relatively stiff coil springs 45, so that if the rotation of the main shutter is suddenly changed the blow from the stop pins will be cushioned.

In operation, the wind resistance against the vances 43 and 44 retards the auxiliary shutter against the action of the spring 41 until the lug 39 strikes the rear pin 38 and the two shutters coincide so that the apertures in the main shutter are uncovered. When the rotation is stopped, the auxiliary shutter is immediately moved forwardly to cover the apertures. Also the rotation of the vanes forces the air outwardly and discharges it through the peripheral space between the housing members 30 and 31, creating a partial vacuum which causes air to flow in past the aperture plate and through the aperture 21. This cools the plate and film and prevents a large amount of the heat of the lamp from reaching the same.

Against the inner face of the rear shutter housing member 31 are provided means for dousing the light, described as follows: At one side of the aperture 34, near the center of the plate, is fixedly secured a short stud 48 by means of a screw 49, see Fig. 3. The stud is provided with a head 50 under which is retained the pivotal ends of two blades 51 and 52 which cooperate to cover the aperture 34. A stud 53 is provided in each blade a short distance radially and forwardly from the pivotal connection when the blades are in the closed position, as shown in full lines in Fig. 6; and one arm of a yoke 54 is pivotally connected to the stud in the upper blade 51, and the other arm is vertically slotted to engage the stud 53 in the lower blade 52. The converging movement of the blades is limited by the contact of the crotch of the yoke with the head 50 of the stud 48. This provides a positive closed position stop which will withstand the shocks to which it is submitted.

The douser is operated by means of a bell crank lever 55 which is pivotally mounted on a screw 56 which extends through the upper portion of the plate 31. One arm of the operating lever extends downwardly and is pivotally connected to the central portion of the yoke 54; and the outer portion of the other arm extends radially through a slot 57 in the marginal flange 58 of the plate 31, and the end is bent laterally to form a handle 59. The contact of the handle 59 with the margin of the plate serves as a stop for limiting the divergent position of the blades 51 and 52, shown in broken lines in Fig. 6. The blades are stabilized in either position by means of a U shaped spring 60 which is hooked over the two studs 53. When the blades are closed the two studs 53 are on the forward side of the pivot, and in this position the spring acts to urge the blades together; but in opening the blades the studs pass to the opposite side of the pivot so that the spring then urges the blades apart. Thus the spring retains the blades in either position, and assists the opening and closing movements.

By providing two blades and moving both, the action of the douser is very quick. The parts are readily dismounted by removing the two screws 49 and 56, and the mechanism occupies very little space laterally.

Having thus described illustrative embodiments of my invention, it is to be understood that many alterations and omissions in the exact construction shown may be made without departing from the spirit of the invention, as defined in the claims which are made, as follows:

I claim:

1. The combination in an intermittent light interceptor of a positively driven apertured shutter, an auxiliary shutter rotatably mounted in coaxial relation with said shutter, a rotatably mounted connection disc interposed between the two shutters, projecting means mounted on the disc and the positively driven shutter for limiting the relative movement therebetween, a traction spring urging the disc forwardly from the shutter, the disc having a lug for driving the auxiliary shutter, and a cushioning spring urging the auxiliary shutter forwardly into contact with the driving lug, the auxiliary shutter having radial vanes mounted thereon so that the wind resistance retards the auxiliary shutter to the limit of its motion rearwardly when the positively driven shutter is in motion.

2. In combination, a rotary apertured main shutter having spaced stops mounted thereon, a disc rotatably mounted concentric with the main shutter and movable between said stops, the disc having a lug formed thereon, an auxiliary shutter having radial retarding vanes mounted in concentric relation with the main shutter and disc but separately rotatable, a shock absorbing spring yieldably urging the auxiliary shutter against the lug on the disc, and a light traction spring connecting the disc to the main shutter so that at rest the apertures in the main shutter are covered by the auxiliary shutter, and the apertures are opened as the main shutter is put into rotation.

3. Intermittent light intercepting means comprising a main rotary apertured shutter, an auxiliary apertured rotary shutter, a connection disc rotatably mounted co-axially with the shutters, a light spring between the main shutter and the disc tending to urge the disc ahead of the shutter, an angular rib forming a radial retarding vane on the auxiliary shutter, and a peripheral lug on the disc for engaging the rib of the auxiliary shutter to drive it.

4. A structure in accordance with claim 3 in which the disc and the auxiliary shutter are connected by a cushioning spring which tends to hold them together.

5. Intermittent light intercepting means comprising a main rotary apertured shutter having spaced stops thereon adjacent the axis, an auxiliary apertured rotary shutter with radial wind retarding ribs extending adjacent the axis, an interposed connection disc rotatable co-axially with the shutters and having a lug to engage either one of the spaced stops of the main shutter and having peripheral shoulders to engage the inner ends of the ribs of the auxiliary shutter, a light spring connecting the disc to the main shutter and tending to urge it ahead of the shutter with its lug in engagement with one of the stops of the main shutter, and the lug being in engagement with the other stop when the shoulders engage the ribs of the auxiliary shutter in driving the shutters together.

6. Intermittent light intercepting means in accordance with claim 5 in which the intermediate disc is connected to the auxiliary shutter by means of a relatively stiff coil spring having one end connected to the inner end of the rib and the other end connected to a lug struck up from the disc for cushioning the shock between the shutters when one is suddenly stopped.

7. In an intermittent light intercepter, a positively driven apertured shutter having spaced projections, an auxiliary concentric shutter to close the apertures of the other shutter, a separately rotatable connection disc mounted between the shutters having a projection engageable with the spaced projections of the first shutter and having a lug to engage the auxiliary shutter for driving it, a spring tending to move the auxiliary shutter to close the apertures of the other shutter, and a shock absorbing spring tending to hold the auxiliary shutter against the driving lug of the disc from which it is separated when the apertured shutter is suddenly stopped.

LLOYD J. ANDRES.